(12) United States Patent
Botev et al.

(10) Patent No.: US 10,821,840 B2
(45) Date of Patent: Nov. 3, 2020

(54) POWER SUPPLY ARRANGEMENT WITH AN INTERFACE FOR OPERATION OF A MULTI-VOLTAGE SYSTEM

(71) Applicant: Deere & Company, Moline, IL (US)

(72) Inventors: Decho Botev, Mannheim (DE); Christopher D. Turner, Waterloo, IA (US)

(73) Assignee: DEERE & COMPANY, Moline, IL (US)

(*) Notice: Subject to any disclaimer, the term of this patent is extended or adjusted under 35 U.S.C. 154(b) by 441 days.

(21) Appl. No.: 15/794,461

(22) Filed: Oct. 26, 2017

(65) Prior Publication Data

US 2018/0118038 A1 May 3, 2018

(30) Foreign Application Priority Data

Oct. 28, 2016 (DE) .......................... 10 2016 221 329

(51) Int. Cl.
*A01B 76/00* (2006.01)
*B60L 1/00* (2006.01)
(Continued)

(52) U.S. Cl.
CPC .............. *B60L 50/15* (2019.02); *A01B 76/00* (2013.01); *B60L 1/00* (2013.01); *B60L 11/18* (2013.01);
(Continued)

(58) Field of Classification Search
USPC ........................................................ 307/106
See application file for complete search history.

(56) References Cited

U.S. PATENT DOCUMENTS

2005/0067898 A1\* 3/2005 Gronbach ............... B60L 58/20
307/10.1
2015/0203060 A1\* 7/2015 Kamioka .............. B60R 16/033
307/10.1
(Continued)

FOREIGN PATENT DOCUMENTS

DE 101 60 266 A1 6/2003
DE 10231517 A1 2/2004
(Continued)

OTHER PUBLICATIONS

European Search Report issued in counterpart application No. 17198307.5 dated Feb. 5, 2018. (9 pages).
(Continued)

*Primary Examiner* — Rexford N Barnie
*Assistant Examiner* — Xuan Ly

(57) ABSTRACT

A power supply arrangement having an interface for operation of a multi-voltage system of an agricultural vehicle includes a first network segment with a motor generator connected thereto and a second network segment with a lead battery connected thereto. The first network segment has a first voltage level corresponding to a nominal voltage of the lead battery for operation of an electric vehicle components, and the second network segment includes a higher second voltage level for charging the lead battery and providing electric power to an electric load comprising an agricultural implement. The interface forms a voltage source connecting the two network segments and provides an equalization voltage resulting from the two voltage levels in a charging mode and which is bypassed in a motor operating mode.

14 Claims, 6 Drawing Sheets

(51) Int. Cl.
*B60L 50/15* (2019.01)
*H02J 7/14* (2006.01)
*B60R 16/03* (2006.01)
*H02J 1/00* (2006.01)
*B60L 50/60* (2019.01)
*B60L 11/18* (2006.01)
*H02J 1/08* (2006.01)
*H02M 3/158* (2006.01)

(52) U.S. Cl.
CPC .............. *B60L 50/60* (2019.02); *B60R 16/03* (2013.01); *H02J 1/00* (2013.01); *H02J 7/1423* (2013.01); *B60L 2200/40* (2013.01); *H02J 1/082* (2020.01); *H02M 3/158* (2013.01); *Y02T 10/7016* (2013.01); *Y02T 10/7077* (2013.01)

(56) References Cited

U.S. PATENT DOCUMENTS

2016/0322672 A1* 11/2016 Goetz ...................... B60L 53/22
2018/0109122 A1* 4/2018 Koerner .............. H01M 10/441

FOREIGN PATENT DOCUMENTS

| | | | |
|---|---|---|---|
| DE | 102 51 589 A1 | 5/2004 |
| DE | 103 44 563 A1 | 4/2005 |
| DE | 10344563 A1 | 4/2005 |
| DE | 10 2005 051 433 A1 | 5/2007 |
| DE | 102005051433 | * | 5/2007 |
| DE | 102005051433 A1 | 5/2007 |
| DE | 10 2012 206 932 A1 | 10/2013 |
| DE | 102012009738 A1 | 11/2013 |
| DE | 11 2012 007 029 T5 | 7/2015 |
| DE | 112012007029 T5 | 7/2015 |
| DE | 10 2014 104 946 A1 | 10/2015 |
| DE | 10 2015 206 366 A1 | 10/2016 |

OTHER PUBLICATIONS

European Search Report issued in counterpart application No. 10 2016 221 329.6 dated Jul. 31, 2017 (10 pages).

* cited by examiner

POWER SUPPLY ARRANGEMENT WITH AN INTERFACE FOR OPERATION OF A MULTI-VOLTAGE SYSTEM

RELATED APPLICATIONS

This application claims priority to German Application Ser. No. 102016221329.6, filed Oct. 28, 2016, the disclosure of which is hereby expressly incorporated by reference in its entirety.

FIELD OF THE DISCLOSURE

The present disclosure relates to a power supply arrangement with an interface for operation of a multi-voltage system of an agricultural vehicle, in particular an agricultural tractor.

BACKGROUND

Power supply arrangements known from the automotive sector typically include, besides a motor generator which can, as desired, be operated as an auxiliary electric drive or also as a current generator, a chargeable energy storage means for intermediate storage of the electric power generated by means of the motor generator. The chargeable energy store is usually a lithium ion or lead battery. The latter is relatively cheap and robust, so it is suitable for use in the agricultural vehicle sector. However, the circumstance that the charging voltage needed to charge the lead battery is higher than its nominal voltage is a problem. This can lead to damage of electric vehicle components connected to it, such as electronic control devices, electric auxiliary generators, and the like, especially when they are adapted to the use of lithium ion batteries that are conventional in the automobile sector since, in this case, elevated charging voltages do not arise to a comparable degree.

The ongoing electrification in the agricultural vehicle sector leads to different requirements on the power supply, which is reflected especially in the parallel use of different voltage levels. For example, it is desirable to use one and the same motor generator to supply electric power not only to electric vehicle components on an onboard network of the agricultural vehicle, but also to supply those electric loads that require a higher voltage level than the onboard network because of their power requirements. Such an electric load can, for example, consist of an agricultural implement and serve to carry out various soil working functions or the operation of an electric wheel drive.

There is a need therefore to specify a power supply arrangement with an interface for operation of a multi-voltage system of an agricultural vehicle that resolves the conflicting aims.

SUMMARY

In one embodiment of the present disclosure, a power supply arrangement with an interface for operation of a multi-voltage system of an agricultural vehicle includes a first network segment with a motor generator connected to it and a second network segment with a lead battery connected to it, where the first network segment has a first voltage level corresponding to the nominal voltage of the lead battery for operation of electric vehicle components, and the second network segment has a second voltage level that is different from and higher than the first voltage level for charging the lead battery, and is used to supply electric power to an electric load comprised by an agricultural implement, where the interface forms a voltage source connecting the two network segments, and the voltage source provides an equalization voltage resulting from the two voltage levels in a charging mode and is bypassed in a motor operating mode.

More precisely, in charging mode, which is characterized by the motor generator being employed to generate electric power, the first voltage level is raised by means of the voltage source to the second voltage level, which is suitable for charging the lead battery or for operating the electric load of the agricultural implement.

In motor operating mode, on the other hand, the motor generator acts to generate a corresponding drive torque with the electric power available on the part of the lead battery, where the operation of the electric load is interrupted during this period. To this extent, a prioritization of the motor operation takes place with respect to supplying the electric load of the agricultural implement with electric power. Because of the bypassing of the voltage source, the first and second network segments then have the same voltage level, namely the first voltage level.

The agricultural vehicle is in particular an agricultural tractor, in the front or rear region of which there are appropriate connecting plugs for power supply or control of the agricultural implement or the electric load comprised by it.

The first voltage level is 48 volts and the second is 56 volts, as a result of which an equalization voltage of 8 volts is made available by the voltage source. The first voltage level is thus matched to the use of standard components from the automotive or utility vehicle sector, in particular in accordance with the LV148/VDA320 standard, whereas the second voltage level corresponds to the charging voltage needed for lead batteries that have a nominal voltage of 48 volts and meets the higher power requirements of electrically operated agricultural implements.

In this case, there is the possibility that the motor generator is designed as a starter generator to start an internal combustion engine connected to it. Particularly in the case of high powered high displacement diesel engines, the use of a 48-volt onboard network provides appropriately high starting or cranking torques.

In addition, the voltage source can be a floating voltage converter powered from an outside voltage source. Here, in addition to the expected maximum current, the equalization voltage (relatively low compared to the first or second voltage level) is used for the assessment of the available power. The power requirements on the voltage source are correspondingly low, so that it can be cheaply realized. The voltage converter is a common and thus tested component, which has an intermediate transformer in addition to an input-side and an output-side rectifier. The lead battery or a center tap comprising it, where a lower supply voltage than the nominal voltage of the lead battery is then available for operation of the voltage converter, can serve as an outside voltage source.

Alternatively, the voltage source can be a boost converter connected in series with the first and second network segment. It is characterized by a simpler structure than the floating voltage converter. In principle, however, in this case, the second voltage level should be set higher for the assessment of the available power in addition to the expected maximum current.

In the simplest case, the bypassing of the voltage source takes place by means of an electromagnetic relay or a semiconductor switch. The semiconductor switch can be a component of an output-side inverter of the voltage source, but it can also be a separate component. The semiconductor switch is usually a power MOSFET.

It is further conceivable that in a pre-charging operating mode preceding the motor operating mode, the voltage source is bypassed for a specified pre-charging time by means of a current limiting element in order to limit an inductively conditioned starting current spike when the motor generator is put into operation and to prevent resulting damage of the electric vehicle components connected to the first network segment.

In addition, the lead battery can have a center tap connected to the first network segment, so that the first network segment can operate at a first voltage level that is lower than the nominal voltage of the lead battery. The center tap is located between the individual cells of the lead battery of which each has a nominal voltage of 6 volts. For the case of a lead battery with a nominal voltage of 48 volts, the voltage of the center tap can be, for example, 42 volts, and can be tapped between the first and the remaining seven of the series connected cells.

Moreover, it is possible that a toggle switch is provided for switching between the charging mode and the motor operating mode so that the second network segment is connected to the voltage source in the charging mode and to the first network segment in the motor operating mode. The second network segment is then completely separate from the voltage source, so that the voltage source can remain connected. The toggle switch in this case can be structurally integrated into the voltage source in the form of an electromagnetic relay.

If the lead battery has a center tap, then in a departure from the design noted above, a double toggle switch can be provided for switching between the charging mode and the motor operating mode so that, in charging mode, the first network segment is connected to the motor generator and the second network segment is connected to the voltage source. In motor operating mode, the second network segment is connected to the motor generator instead of the first network segment. In the charging mode, the voltage source thus charges the first cell of the lead battery above the center tap, whereas the motor generator charges the remaining seven cells. Here, too, the voltage source can remain connected in charging mode.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

Figure 1:
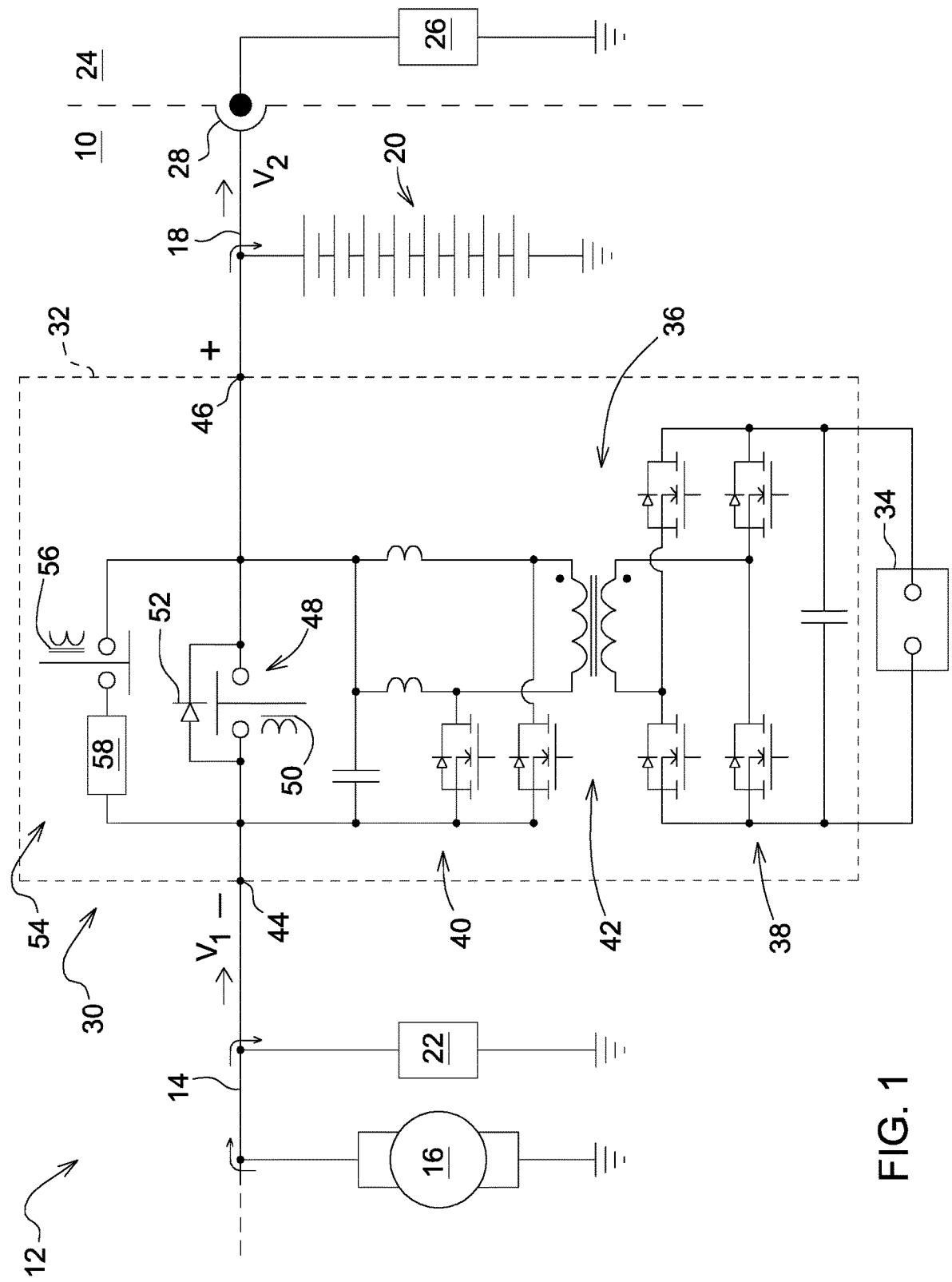
FIG. 1 shows a first embodiment of a power supply arrangement with a voltage source designed as a floating voltage converter in a charging mode.
Figure 2:
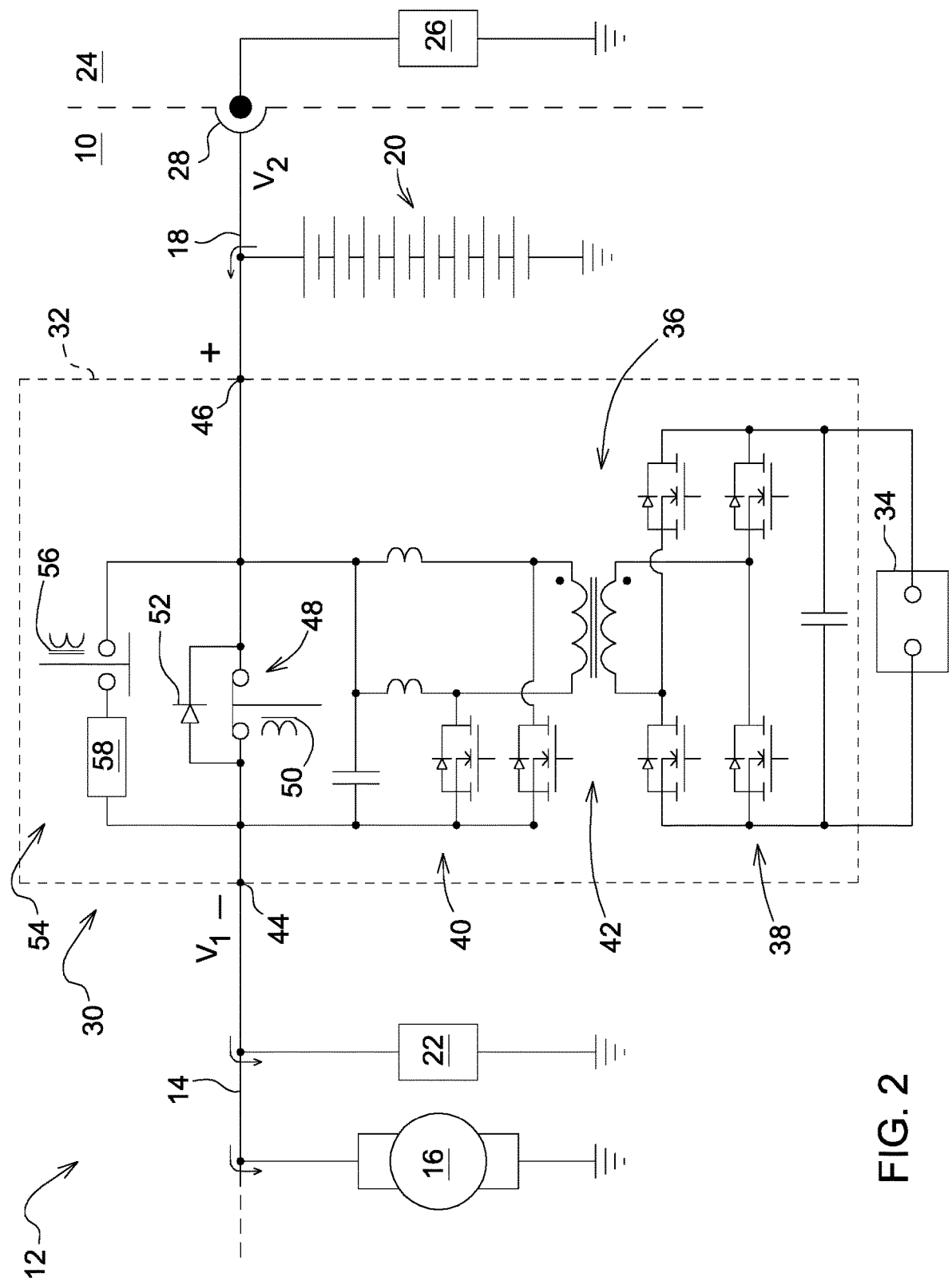
FIG. 2 shows the power supply arrangement of FIG. 1 where the voltage source is in a motor operating mode.

FIGS. 1 and 2 show a first embodiment of a power supply arrangement with an interface for operation of a multi-voltage system in different operating modes in each case.

The power supply arrangement 12 accommodated in an agricultural vehicle 10 comprises a first network segment 14 with a connected motor generator 16 and a second network segment 18 with a connected lead battery 20. The first network segment 14 has a first voltage level $V_1$ that corresponds to the nominal voltage of the lead battery, for operation of a plurality of electric vehicle components 22. The electric vehicle components 22 are, for example, electronic control devices, electrically driven auxiliary units, and the like. The second network segment 18 has a higher voltage level $V_2$ than the first network segment, for charging the lead battery 20 and for providing electric power to an electric load 26, which is comprised by an agricultural implement 24. The implement serves to carry out various soil working functions or to operate an electric wheel drive.

The agricultural vehicle 10 is, for example, an agricultural tractor, in the front or rear region of which there are appropriate plug connectors 28 for energy supply or control of the agricultural implement 24 or the electric load 26 comprised by it.

The interface 30 for operation of the multi-voltage system forms a voltage source 32 connecting the two network segments 14, 18. The voltage source 32 is, in this case, a floating voltage converter 36 powered from an external voltage source 34. The voltage converter 36 comprises, besides an input-side and output-side inverter 38, 40, which is shown schematically in FIG. 1, a transformer 42 connected between them. The lead battery 20 serves as the external voltage source 34.

In a charging mode, which is shown in FIG. 1, the voltage source 32 formed by the voltage converter 36 has available at its output terminals 44, 46 an equalization voltage resulting from the two voltage levels $V_1$, $V_2$, whereas, in a motor operating mode shown in FIG. 2, the voltage source 32 is bypassed by closing an associated switching element 48, in the form of an electromagnetic relay 50.

More precisely, in charging mode, which is characterized in that the motor generator 16 is employed to generate electric power, the first voltage level $V_1$ is raised by means of the voltage source 32 to the second voltage level $V_2$ that is suitable for charging the lead battery 20 or for operating the electric load 26 of the agricultural implement.

In motor operating mode, on the other hand, the motor generator 16 is supplied with electric power available from the lead battery 20 in order to generate a corresponding drive torque, and the operation of the electric load 26 is interrupted during this period. In this respect there is a prioritization of the motor operation over a provision of the electric load 26 of the agricultural implement 24 with electric power. Because of the bypassing of the voltage source 32, the first and second network segment 14, 18 then have the same voltage level, namely the first voltage level $V_1$. In the present case, since the two output terminals 44, 46 of voltage source 32 are short-circuited for this by means of the switching element 48, it is disconnected during the motor operating mode.

The current flow established in the two operating modes is indicated in FIGS. 1 and 2 by arrows.

According to the example, the first voltage level $V_1$=48 volts and the second voltage level $V_2$=56 volts, as a result of which an equalization voltage of 8 volts is made available by voltage source 32. The first voltage level $V_1$ is thus matched to the use of standard components from the automotive or utility vehicle sector, in particular in accordance with the LV148/VDA320 standard, whereas the second voltage level $V_2$ corresponds to the required charging voltage for lead batteries that have a nominal voltage of 48 volts, and satisfies the higher power requirements of electrically operated agricultural implements.

In the present case, the motor generator 16 is designed as a starter generator for starting an internal combustion engine that is drive-connected with it. The use of a 48-volt onboard network enables the provision of appropriately high starting or cranking torques, especially in the case of high-power, high-displacement diesel engines.

Summarizing, the interface 30 thus forms a voltage source 32 connecting the two network segments 14, 18, which provides an equalization voltage resulting from the two voltage levels $V_1$, $V_2$ in a charging mode and which is bypassed in a motor operating mode.

According to FIG. 2, the voltage source 32 is bypassed by closing the electromagnetic relay 50, where a protective diode 52 is connected in parallel with it. However, in a departure from this, the electromagnetic relay 50 can also be replaced by a semiconductor switch. The semiconductor switch can be a component of the output-side inverter 40 of the voltage source, but it can also be a separate component. The semiconductor switch is usually a power MOSFET.

In addition, in a pre-charging mode connected to the motor operating mode, the voltage source 32 is bypassed for a preset pre-charging time by means of a current limiting element 54, in order to limit an inductively caused starting current spike when the motor generator 16 is put into operation and to prevent accompanying damage to the electric vehicle components 22 connected to the first network segment 14. The current limiting element 54 is a power resistor 58 that can be connected by means of an additional electromagnetic relay 56 or an NTC thermistor (not shown).

Figure 3:
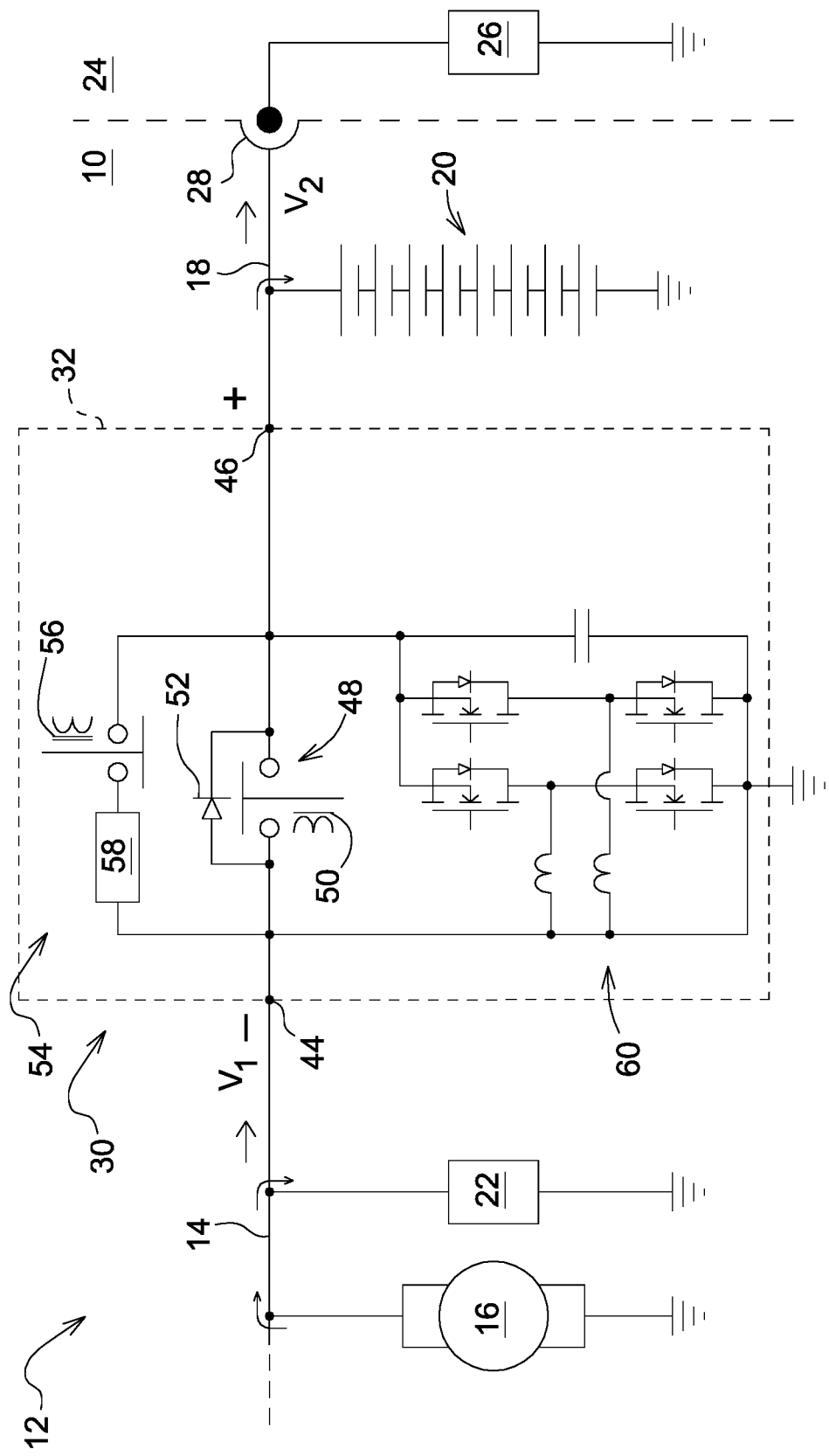
FIG. 3 shows a second embodiment of a power supply arrangement with a voltage source designed as a boost converter in a charging mode.
Figure 4:
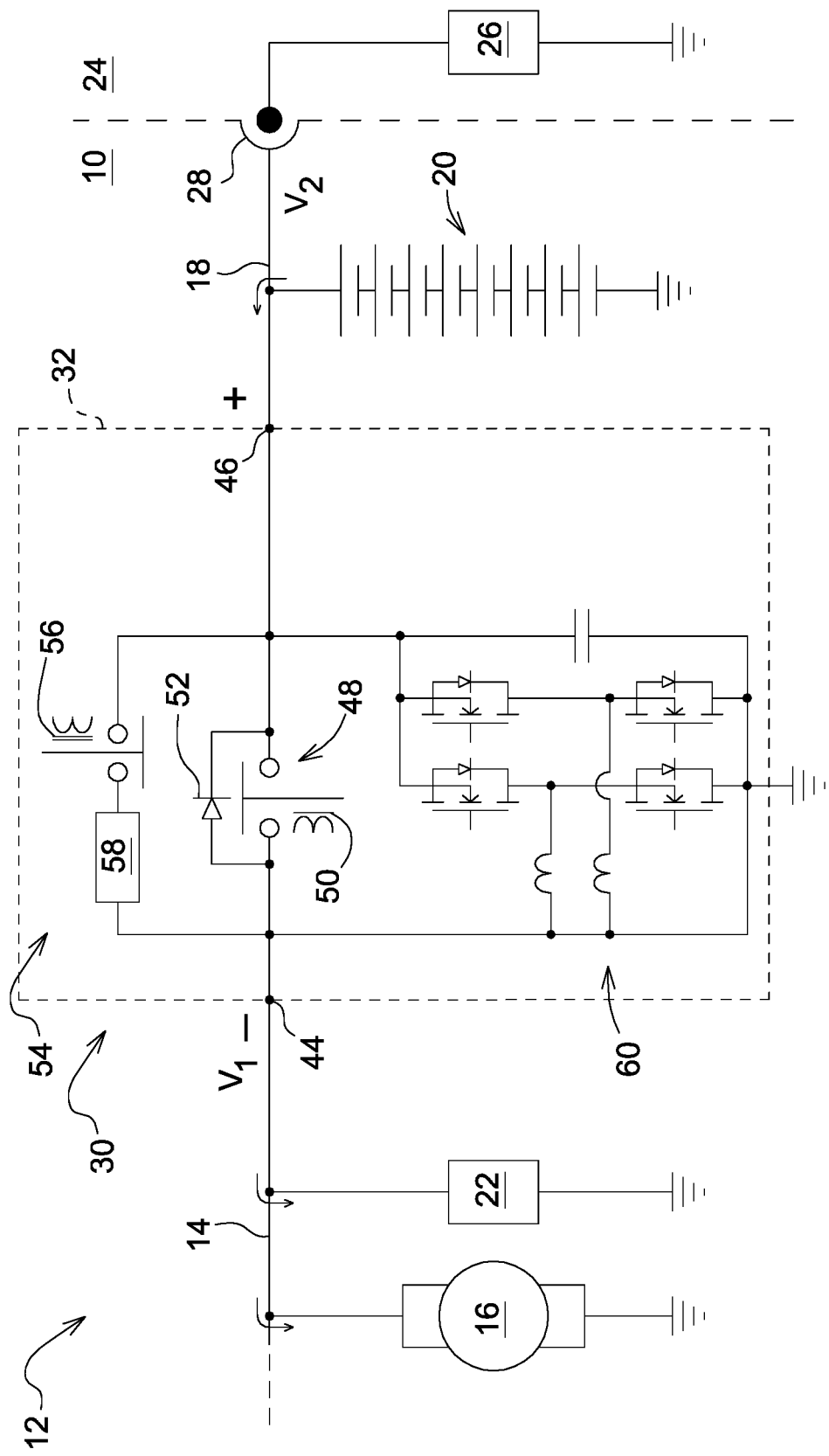
FIG. 4 shows the power supply arrangement of FIG. 3 where the voltage source is in a motor operating mode.

FIGS. 3 and 4 show a second embodiment of the power supply arrangement. This arrangement differs from the previously described first embodiment example with regard to the design of current source 32.

Accordingly, the current source 32 is a boost converter 60 in the form of a DC/DC converter, which is connected in series with the first and the second network segments 14, 18 and which provides an output voltage of 56 volts (corresponding to the second voltage level $V_2$) at the second network segment 18 for an input voltage of 48 volts (corresponding to the first voltage level $V_1$) at the first network segment 14. With regard to the basic functioning of the power supply arrangement 12, including the two operating modes, one is referred to the above first embodiment example.

Figure 5:
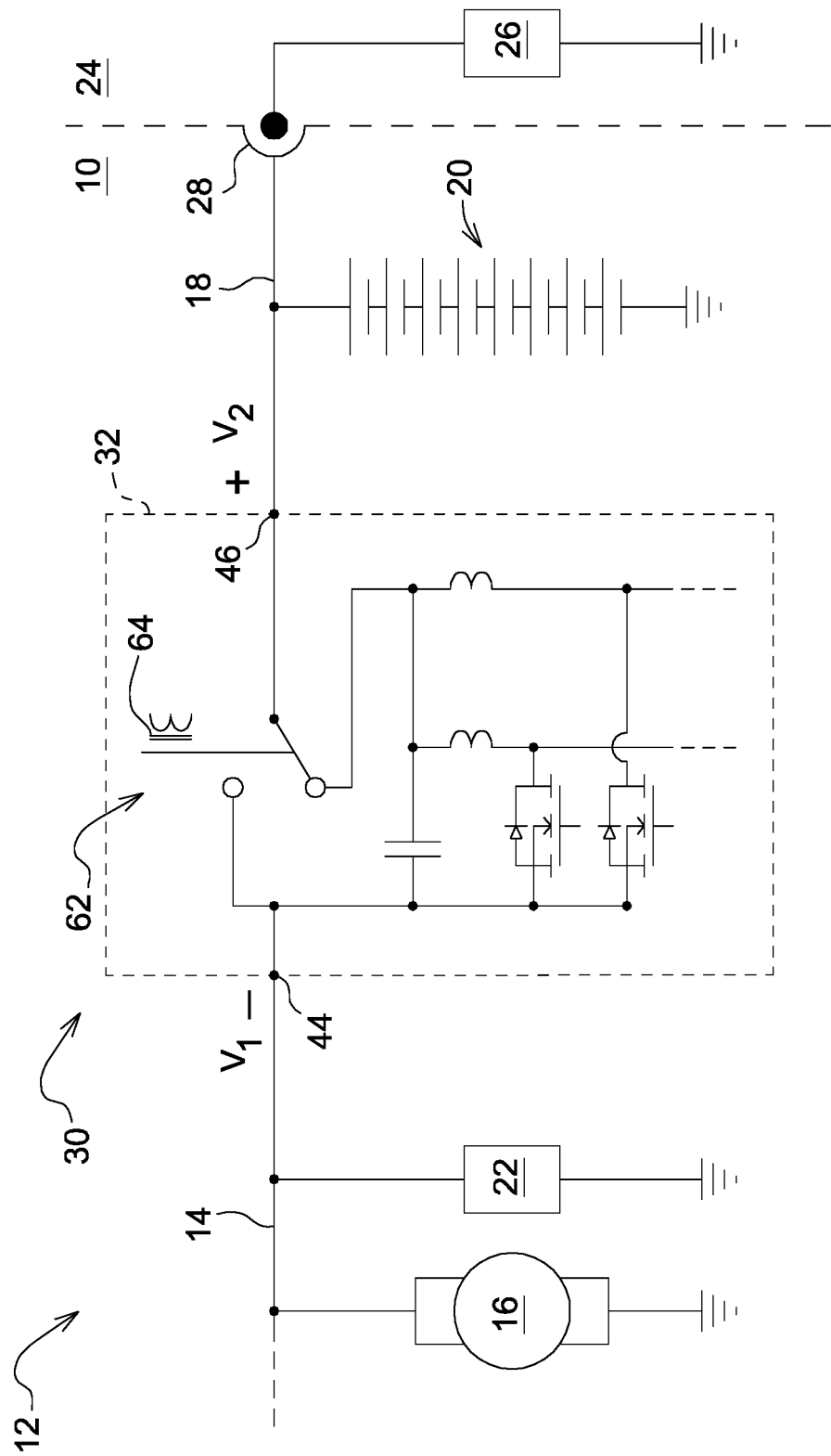
FIG. 5 shows an alternative design of a switching element for bypassing the voltage source in charging mode of the embodiments of FIGS. 2 and 4.

FIG. 5 shows an alternative design of the switching element for bypassing the voltage source, where the latter can be made as voltage converter 36 or boost converter 60.

Accordingly, a toggle switch 62 is provided as switching element 48 for switching between the charging mode represented in FIG. 5 and the motor operating mode so that the second network segment 18 is connected to voltage source 32 in charging mode and to the first network segment 14 in motor operating mode. The second network segment 18 is then completely separate from voltage source 32, so that it can remain connected. The toggle switch 62 is structurally integrated into the voltage source 32 in the form of an electromagnetic relay 64.

Figure 6:
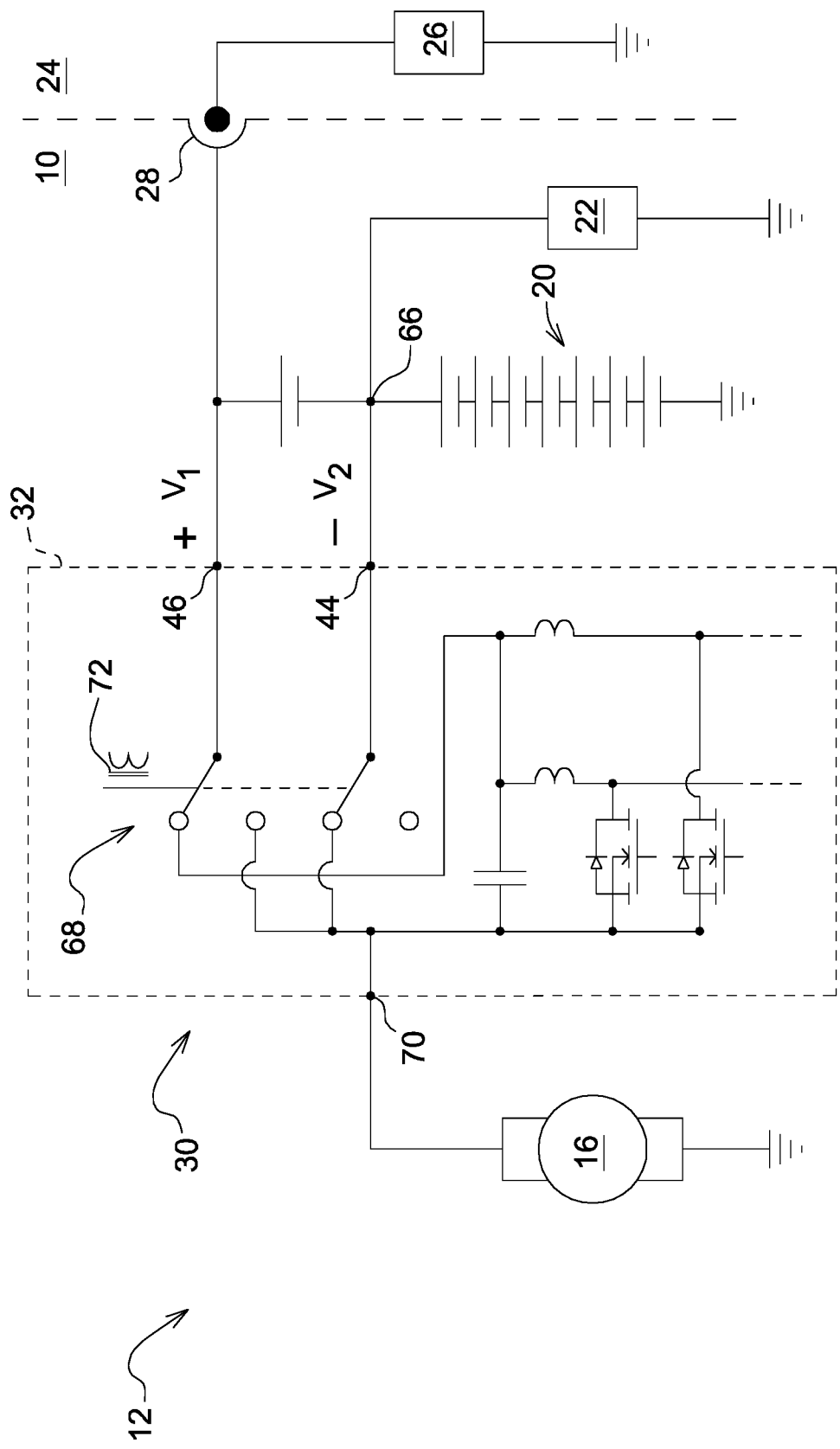
FIG. 6 shows a modification of the power supply arrangement of FIG. 5 with a center tap provided on a lead battery.

FIG. 6 shows a modification of the power supply arrangement 12 according to FIG. 5, in which the lead battery 20 has a center tap 66 connected to the first network segment 14 so that the first network segment 14 can be operated at a first voltage level $V_1$ that is lower than the nominal voltage of the lead battery 20. The center tap 66 is situated between the individual cells of the lead battery 20, each of which has a nominal voltage of 6 volts. For the case of a lead battery 20 with a nominal voltage of 48 volts that is shown, the voltage at the center tap is, for example, 42 volts and is tapped between the first and the remaining seven of the series-connected cells.

In this case, a double toggle switch 68 is provided for switching between the charging mode shown in FIG. 6 and the motor operating mode so that, in charging mode, the first network segment 14 is connected via an intermediate terminal 70 to the motor generator 16 and the second network segment 18 is connected to voltage source 32. In motor operating mode, the second network segment 18 is connected to the motor generator 16 instead of the first network segment 14. During the charging mode, the voltage source 32 thus charges the first cell of the lead battery 20, whereas the motor generator 16 charges the other seven cells. Here, too, the voltage source 32 can remain connected in charging mode.

The double toggle switch 68 is structurally integrated into voltage source 32 in the form of an electromagnetic relay 72.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A power supply arrangement having an interface for operation of a multi-voltage system of an agricultural vehicle, comprising:
    a first network segment with a motor generator connected thereto;
    a second network segment with a lead battery connected thereto, where the first network segment has a first voltage level corresponding to a nominal voltage of the lead battery for operation of an electric vehicle components, and the second network segment comprises a higher second voltage level for charging the lead battery and providing electric power to an electric load comprising an agricultural implement; and
    a double toggle switch for switching between the charging mode and the motor operating mode;
    where the interface forms a voltage source connecting the two network segments and provides an equalization voltage resulting from the two voltage levels in a charging mode and which is bypassed in a motor operating mode;
    wherein the lead battery comprises a center tap connected to the first network segment; and
    wherein, in the charging mode, the first network segment is connected to the motor generator and the second network segment is connected to the voltage source, and in the motor operating mode, the second network segment is connected to the motor generator instead of the first network segment.

2. The power supply system of claim 1, wherein the first voltage level is about 48 volts and the second voltage level is about 56 volts.

3. The power supply system of claim 1, wherein the motor generator comprises a starter generator for starting an internal combustion engine.

4. The power supply system of claim 1, wherein the voltage source comprises a floating voltage converter powered by an external voltage source.

5. The power supply system of claim 1, wherein the voltage source comprises a boost converter connected in series with the first and second network segments.

6. The power supply system of claim 1, wherein the bypassing of the voltage source takes place by an electromagnetic relay or a semiconductor switch.

7. The power supply system of claim 1, wherein, in a pre-charging mode connected to the motor operating mode, the voltage source is bypassed for a preset pre-charging time by means of a current limiting element.

8. An agricultural vehicle, comprising:
    a power supply arrangement having an interface for operation of a multi-voltage system;
    a first network segment with a motor generator connected thereto;
    a second network segment with a lead battery connected thereto, where the first network segment has a first voltage level corresponding to a nominal voltage of the lead battery for operation of an electric vehicle components, and the second network segment comprises a higher second voltage level for charging the lead battery and providing electric power to an electric load comprising an agricultural implement; and
    a double toggle switch for switching between the charging mode and the motor operating mode;
    where the interface forms a voltage source connecting the two network segments and provides an equalization voltage resulting from the two voltage levels in a charging mode and which is bypassed in a motor operating mode;
    wherein the lead battery comprises a center tap connected to the first network segment; and
    wherein, in the charging mode, the first network segment is connected to the motor generator and the second network segment is connected to the voltage source, and in the motor operating mode, the second network segment is connected to the motor generator instead of the first network segment.

9. The agricultural vehicle of claim 8, wherein the first voltage level is about 48 volts and the second voltage level is about 56 volts.

10. The agricultural vehicle of claim 8, wherein the motor generator comprises a starter generator for starting an internal combustion engine.

11. The agricultural vehicle of claim 8, wherein the voltage source comprises a floating voltage converter powered by an external voltage source.

12. The agricultural vehicle of claim 8, wherein the voltage source comprises a boost converter connected in series with the first and second network segments.

13. The agricultural vehicle of claim 8, wherein the bypassing of the voltage source takes place by an electromagnetic relay or a semiconductor switch.

14. The agricultural vehicle of claim 8, wherein, in a pre-charging mode connected to the motor operating mode, the voltage source is bypassed for a preset pre-charging time by means of a current limiting element.

* * * * *